(12) United States Patent
Ross et al.

(10) Patent No.: US 11,113,119 B2
(45) Date of Patent: Sep. 7, 2021

(54) MANAGING COMPUTER RESOURCES

(71) Applicant: INTERNATIONAL BUSINESS MACHINES CORPORATION, Armonk, NY (US)

(72) Inventors: Martin A. Ross, Gosport (GB); Andrew S. M. Edwards, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 129 days.

(21) Appl. No.: 16/132,843

(22) Filed: Sep. 17, 2018

(65) Prior Publication Data
US 2020/0089544 A1 Mar. 19, 2020

(51) Int. Cl.
*G06F 15/173* (2006.01)
*G06F 9/50* (2006.01)
*H04L 12/911* (2013.01)

(52) U.S. Cl.
CPC .......... *G06F 9/5077* (2013.01); *G06F 9/5072* (2013.01); *G06F 9/5083* (2013.01); *H04L 47/783* (2013.01); *H04L 47/826* (2013.01); *H04L 47/828* (2013.01)

(58) Field of Classification Search
CPC ... H04L 47/783; H04L 47/826; H04L 47/828; G06F 9/5077; G06F 9/5072; G06F 9/5083
USPC ........................................................ 709/206
See application file for complete search history.

(56) References Cited

U.S. PATENT DOCUMENTS

| 9,154,589 | B1 | 10/2015 | Klein et al. | |
| 9,684,562 | B2 | 6/2017 | Bell et al. | |
| 2003/0196052 | A1* | 10/2003 | Bolik | G06F 11/1448 711/162 |
| 2005/0183092 | A1* | 8/2005 | Christensen | G06F 9/546 719/313 |

(Continued)

OTHER PUBLICATIONS

Mell et al., "The NIST Definition of Cloud Computing", Recommendations of the National Institute of Standards and Technology, NIST Special Publication 800-145, Sep. 2011, 7 pages.

(Continued)

*Primary Examiner* — Alan S Chou
(74) *Attorney, Agent, or Firm* — Reza Sarbakhsh

(57) ABSTRACT

A computer-automated method, computer system and computer program for managing resources in applications. The resources are managed in groups, each group having a unique group name which is dynamically resolvable to an address specific to a particular application. The resources may be application program interfaces object instances or data sources, for example. When a resource placement request is received to place a resource in a particular application with an associated address, the resource is assigned to a group and given a unique resource identifier which combines with the group name to form a unique endpoint for the resource. Subsequently, in response to detection of a resource performance bottleneck, or in response to an external request, a resource is moved to another application by reassigning its group name to the second address, thereby moving all resources in that group to the other application.

20 Claims, 6 Drawing Sheets

(56) References Cited

U.S. PATENT DOCUMENTS

| | | | |
|---|---|---|---|
| 2006/0129940 A1* | 6/2006 | Rajarajan | G06F 9/5055 |
| | | | 715/738 |
| 2006/0242647 A1 | 10/2006 | Kimbrel et al. | |
| 2008/0104605 A1 | 5/2008 | Steinder et al. | |
| 2009/0063123 A1* | 3/2009 | Buckler | G06F 16/285 |
| | | | 703/22 |
| 2013/0080628 A1* | 3/2013 | Srinivasan | G06F 40/274 |
| | | | 709/224 |
| 2014/0222987 A1* | 8/2014 | Pearson | H04L 41/04 |
| | | | 709/224 |
| 2016/0226788 A1 | 8/2016 | Chittigala et al. | |
| 2016/0269313 A1 | 9/2016 | Brooker et al. | |
| 2017/0149687 A1 | 5/2017 | Udupi et al. | |
| 2017/0180213 A1* | 6/2017 | Li | H04L 41/08 |
| 2017/0220364 A1* | 8/2017 | Kadioglu | G06F 8/313 |
| 2019/0215351 A1* | 7/2019 | Gordon | H04N 21/8456 |

OTHER PUBLICATIONS

Farag, "Azure Resource Manager (ARM) and moving resources across resource groups", Jul. 21, 2015, 3 pages, https://blogs.msdn.microsoft.com/how24/2015/07/21/azure-resource-manager-arm-and-moving-resources-across-resource-groups/.

* cited by examiner

MANAGING COMPUTER RESOURCES

BACKGROUND

The present disclosure relates to managing computer resources within a computer system.

The management of resources that are hosted by a computer system is relevant to a number of scenarios, use cases and technologies, one of which is a platform-as-a-service (PaaS) application. How to manage resources effectively depends on a number of factors. One important part of managing resources is determining how initially to place, and subsequently to move, a resource within the computer system.

Placing a resource may involve deploying an application to a particular server or runtime, running a job on a particular system or sending a request to perform a given function to a particular instance of an application in a cluster, to name but a few examples. An algorithm is typically employed to place a resource; from simple round-robin or random selection methods. Resource placement may utilize knowledge of the target systems (such as current load, utilization, etc.) and/or the resource (such as message priority, etc.).

International Business Machines Corporation® (IBM®) of Armonk, N.Y., United States of America supplies a product called IBM App Connect which is an application integration tool that allows users to connect applications and data across different environments. IBM and IBM App Connect are trademarks and service marks of IBM. IBM App Connect includes a service that guides the placement of resources to decide what cluster a particular connector instance or application program interface (API) will be instantiated in. Resource placement is performed when the API is created, so that when an endpoint is returned to the customer, the endpoint stays the same when the API is started or stopped, or when a flow is started or stopped for connector instances.

BRIEF SUMMARY OF THE INVENTION

According to one aspect of the disclosure, there is provided a computer-automated method of managing resources in applications running on a computer system, the resources being managed in groups, each group having a unique group name which is dynamically resolvable to an address specific to a particular application. The computer receives a resource placement request to place a resource in a first application having a first address and processes the resource placement request by assigning a group to the resource and a unique resource identifier which combines with the group name to form a unique endpoint for the resource. The computer receives a move request to move the resource out of the first application into a second application having a second address. The computer acts on the move request for the resource by moving its group from the first application into the second application by reassigning its group name to the second address, thereby moving all resources in that group to the second application.

According to another aspect of the disclosure there is provided a computer system for running applications that host resources and managing the resources within their applications. The computer system receives (or may include an input operable to receive) a resource placement request to place a resource in a first application having a first address. The computer processes (or includes a processor operable to process) the resource placement request by assigning a group to the resource and a unique resource identifier which combines with the group name to form a unique endpoint for the resource. The computer receives (or includes a further input operable to receive) a move request to move the resource out of the first application into a second application having a second address. The computer creates applications (or includes an application creator operable to create applications). The computer acts on (or includes a resource mover operable to act on) a move request for a resource by moving that resource's group from the first application into the second application by reassigning its group name to the second address, thereby moving all resources in that group to the second application.

According to another aspect of the disclosure, there is provided a computer program product for managing resources in applications running on a computer system, the resources being managed in groups, each group having a unique group name which is dynamically resolvable to an address specific to a particular application. The computer program product includes a computer-readable storage medium having programming instructions embodied therewith. The program instructions being executable by a processor of a computer to perform a method. The program instructions include instructions for performing the following actions by the computer. The computer receives a resource placement request to place a resource in a first application having a first address and processes the resource placement request by assigning a group to the resource and a unique resource identifier which combines with the group name to form a unique endpoint for the resource. The computer receives a move request to move the resource out of the first application into a second application having a second address. The computer acts on the move request for the resource by moving its group from the first application into the second application by reassigning its group name to the second address, thereby moving all resources in that group to the second application.

BRIEF DESCRIPTION OF THE DRAWINGS

In the following, the present invention will further be described by way of example only with reference to exemplary embodiments illustrated in the figures.

DETAILED DESCRIPTION OF THE PREFERRED EMBODIMENTS

Figure 1:
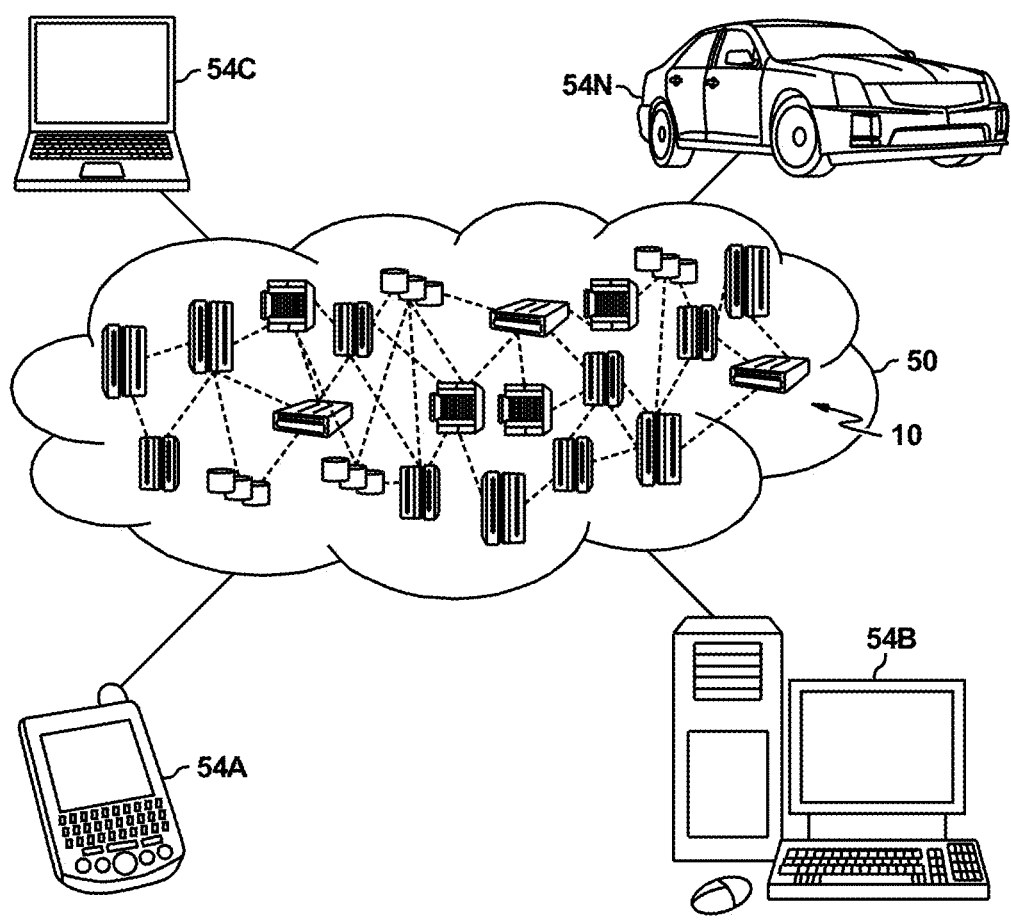
FIG. 1 depicts a cloud computing environment according to an embodiment of the present disclosure.

In the following detailed description, for purposes of explanation and not limitation, specific details are set forth in order to provide a better understanding of the present disclosure. It will be apparent to one skilled in the art that the present disclosure may be practiced in other embodiments that depart from these specific details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
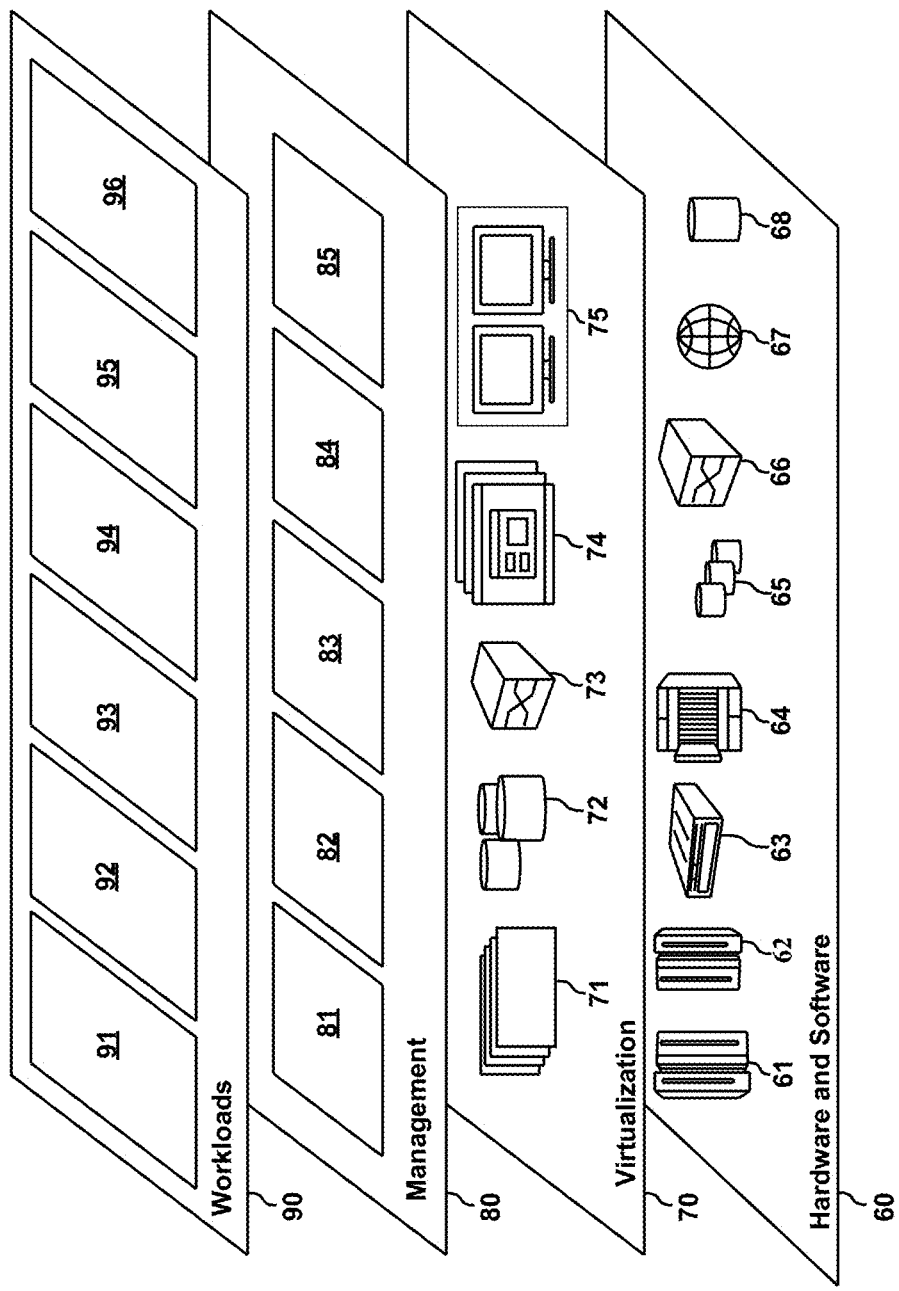
FIG. 2 depicts abstraction model layers according to an embodiment of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and one or more applications 96 as described below.

Before describing embodiments and examples of the implementation, we first state benefits of some embodiments of the invention, provide some examples, and then define some terms that are used when describing these embodiments and examples.

As computer systems scale, mechanisms are needed that are able to place resources into, and move resources between, applications. In particular, it is desirable to avoid that a minority of individual resources, e.g. one or two, within a larger number of resources that share an application consume the majority of available computing power, memory, communication bandwidth or other workload property, resulting in other resources that share the same application having their performance reduced unacceptably.

Embodiments of the invention may provide a method, system, and computer program product for managing resources in applications running on a computer system, the resources being managed in groups, each group having a unique group name which is dynamically resolvable to an address specific to a particular application. By way of example, the first application, Application 1, may have three groups Group 1: http://api.group1.com/
   Group 2: http://api.group2.com/
   Group 3: http://api.group3.com/
and there may be multiple resources in each group, for example Group 3 may have resources:
   Resource 1: http://api.group3.com/resource1
   Resource2: http://api.group3.com/resource2
   Resource3: http://api.group3.com/resource3

As can be seen from this example, each group has a different route (or hostname), and each resource has unique id (resource1, resource2, resource3) which makes it uniquely addressable within the group. If Group3 is to be moved to the second application, Application 2, then after the move http://api.group1.com and http://api.group2.com would still both resolve to Application 1's IP address and so a request would still be sent there. However, after the move, http://api.group3.com would resolve to Application 2's IP address and so a request would be sent there instead.

Each group is thus given a unique name that is dynamically resolvable to an address, in particular an IP address, where multiple names may resolve to the same IP address, i.e. one application may host multiple groups. The move changes the mapping of name to IP address (with respect to domain name system, DNS, lookup), so the name for the group that has been moved resolves to the IP address of the second application instead of the first application. However, the unique endpoints for each resource are retained (rather than the unique endpoints for the groups). The unique endpoints of the resources are made up of the name given to the group (ie. http://api.group1.com) and the universally unique identifier (UUID) for the resource (e.g. 012341asdgjk14923) such as http://api.group1.com/012341asdgjk14923 which would uniquely address that resource within Group1, so that if Group 1 was moved to another application the group name portion (e.g. api.group1.com) would remain the same, but the mapping of the group name portion would change to the IP address of the target application (Application 2 in our example). This change could be effected in the background in a way that was transparent to the user.

App Connect: an application integration tool that allows users to connect applications and data across different environments.

Cloud Foundry: an open source, platform-as-a-service (PaaS) that enables apps to be deployed and scaled. Apps can be run in any programming language over a variety of cloud service providers. This multi-cloud environment allows developers to use a cloud platform that best suits specific app workloads and easily move those workloads as necessary with no changes to the app.

Cloud Foundry Route: an association between an app and an address, wherein the route may be created from HTTP domains or TCP domains, for example.

Certain embodiments of the disclosure can be based on a computer-automated method of managing applications, such as platform-as-a-service (PaaS) applications, running on a computer system to host a plurality of resources.

Figure 3:
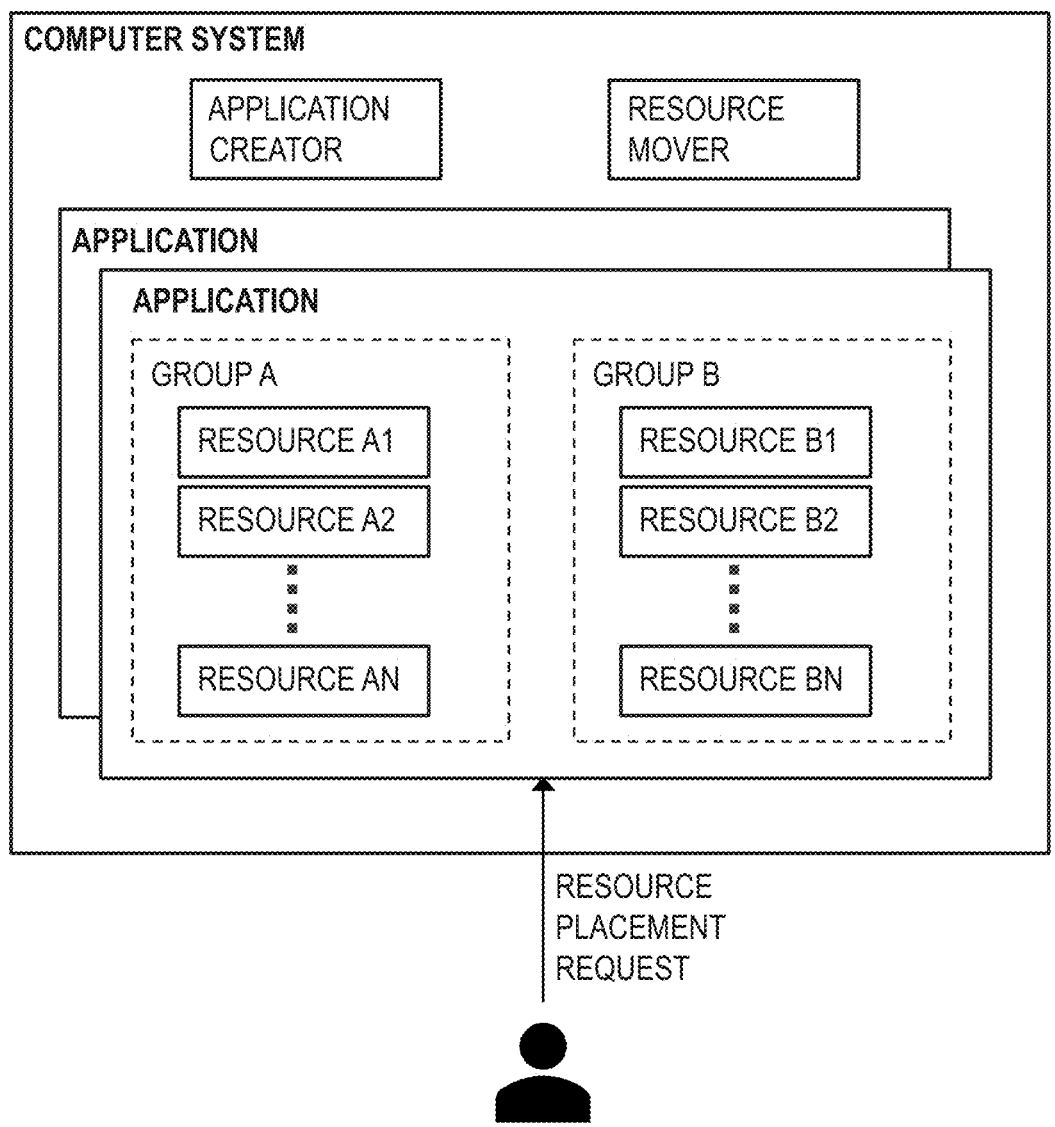
FIG. 3 shows a computer system on which applications can be run and managed, each application being capable of hosting multiple resources.

FIG. 3 shows a computer system on which applications can be run. Each application is capable of hosting multiple resources. According to embodiments of the disclosure, the resources are grouped, with two groups being illustrated by way of example, these being labeled Group A and Group B. The computer system has additional components for creating new applications, labeled application creator, and for moving groups of resources between applications, labeled resource mover. When a user request is received by the computer system to place a resource in a particular application, the application creator has the role of deciding which group to assign the resource to. This assignment or allocation to a group is based on what attributes the resource has and optionally also tags included in the request by the requesting user. The optional tags serve the purpose of providing information to the application creator which is material to the group allocation. Examples of resources are application program interfaces (APIs), object instances and data sources. The group to which a new resource is allocated may be an existing group, or if appropriate a new group may be created for the new resource, e.g. if the new resource has no attributes which match any of the existing groups.

Figure 4:
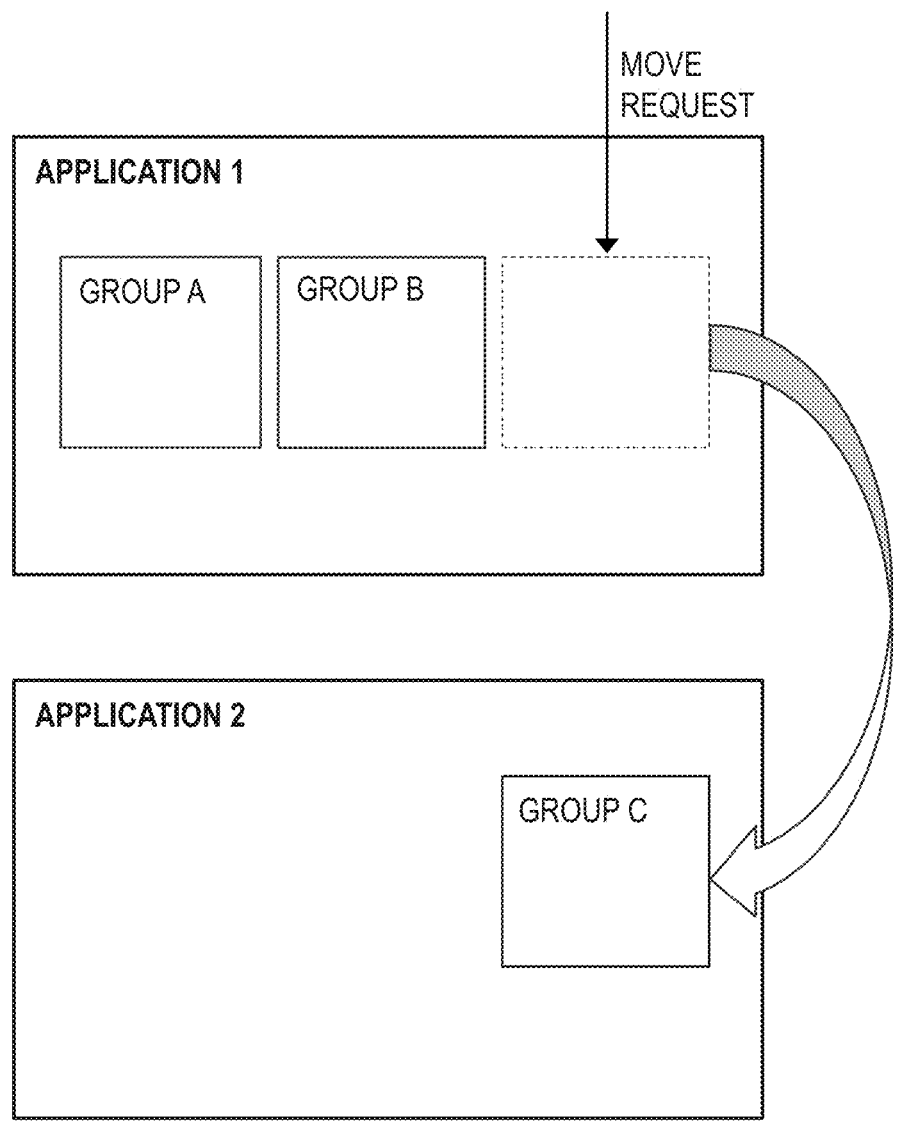
FIG. 4 shows two applications running on the computer system of FIG. 3.

FIG. 4 shows two applications, Application 1 and Application 2, running on the computer system of FIG. 3. Application 1 has three groups of resources, A, B and C. When a request is received to move a group of resources, the application creator generates a new application, Application 2, and then the group subject to the move request, Group C, is moved out of its existing application, Application 1, into the new application, Application 2. Here it is noted that the move request may specify a group, or may specify a single resource. In the latter case, then the move request is applied to all resources that belong to the group of the resource specified in the move request.

Figure 5:
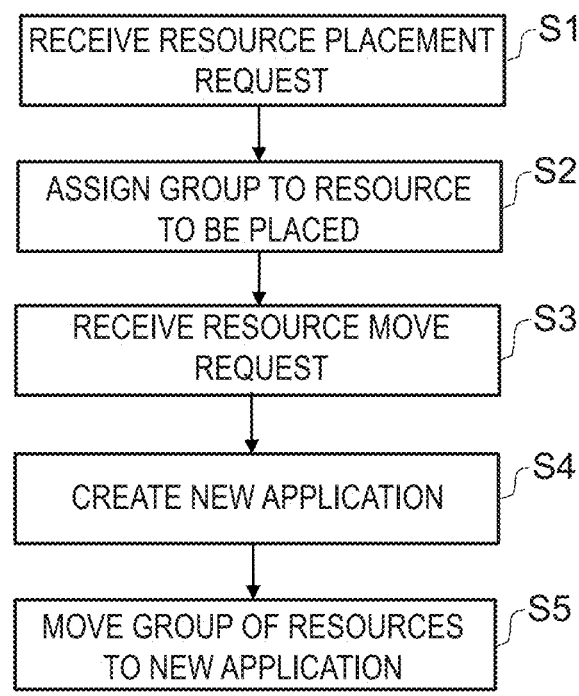
FIG. 5 is a flow diagram showing how a resource group is moved in response to a move request as shown in FIG. 4.

FIG. 5 is a flow diagram showing how a resource group is moved in response to a move request. In Step S1, the action is taken of receiving a resource placement request to place a resource in the application. In Step S2, the action is taken of processing the resource placement request by assigning a group to the resource, wherein all resources of a given group share a route with a unique endpoint. In Step S3, the action is taken of receiving a move request to move a resource out of the application where it is currently placed. In Step S4, the action is taken of creating a new application. In Step S5, the action is taken of moving the group of resources subject to the move request into the new application by moving the group's route to the new application while retaining the group's unique endpoint.

Each group is defined in terms of a resource attribute which all group members need to have in common, or by a combination of such attributes. Example common resource attributes are now given. One attribute is the user who owns the resource. For example, all resources owned by a given user may belong to the same group. Another attribute for grouping is the type of the resource. For example, all messaging resources may be grouped together. A still further attribute for grouping is a consumption property of the resource. For example the consumption property could be a time pattern of use of the resource, e.g. as determined by its usage, or as deduced by the nature of the resource, or deduced from a user tag in the resource placement request. Another consumption property for grouping may be the expected, or known, computing power requirement of the resource. Similarly, the amount of memory required by the resource could be used as a grouping attribute. As mentioned above, tags included in the resource request may be another attribute used for defining groups and allocating resources to groups.

It is noted that the move request may be triggered from an external input, e.g. by a user request, or from an internal input, e.g. when the host computer system, or an application, determines that a resource or group of resources should be moved. This determination may follow from the monitoring system or application or group or individual resource performance. For example, if the service level of a resource in an application falls below a threshold, then this may trigger an internal input to move the group to which that resource belongs. Another example would be when it is determined that no resource in a group has been used for more than a threshold amount of time, or only used below a certain threshold frequency, then this may trigger an internal input that the group should be moved to another application with higher latency that is provided for relatively inactive resource groups.

It will be understood that following this approach the system can be scaled up by generating new applications as needed, and that each new application is managed in the same way as described above for the first application. Additional functionality may be provided for scaling down, by merging existing applications and/or by merging existing groups.

Two examples of the disclosure are now described, with both being based on an App Connect system.

Example 1: Dedicated User Entitlements

1. The system has a single Cloud Foundry application for hosting API resources and is grouping by user identifier (id).
2. A first user (with user id=12345) creates an API.
2a. The system checks and finds that it does not have an existing group for the user with id=12345.
2b. The system creates a new Cloud Foundry route.
2c. The system identifies a Cloud Foundry application, corresponding to Application 1 in the above description, as the target to place the resource.
2d. The system assigns the Cloud Foundry route [see 2b above] to the Cloud Foundry application [see 1 above].
2e. The API is created and the resource unique resource locator (URL) is returned to the user.
3. The first user creates one or more additional APIs which are also assigned to the same Cloud Foundry application.
4. Additional users create APIs which are also assigned to the same Cloud Foundry application.
5. The single Cloud Foundry application is overloaded and the first user is experiencing processing delays on API calls.
6. The first user opts to pay for a dedicated service.
7. On notification of the entitlement change the system starts a new Cloud Foundry application, corresponding to Application 2 in the above description, that can run the APIs.
8. The new Cloud Foundry application starts and instantiates the APIs for the first user.
9. The system moves the route for the group (id=12345) to the new Cloud Foundry application.
10. The first user's APIs now run in the new Cloud Foundry application and are no longer affected by the APIs from the other users.
11. The first user enjoys an improvement in API response and does not need to change anything; the APIs have moved but each has retained the same endpoint address.

Example 2: Multiple Connectors Per Application

1. The system has support for three connectors (gmail, gdrive and gss); all three connectors are hosted in the same Cloud Foundry application ("loopback-connector-provider-google"), corresponding to Application 1 in the above description, and grouping is by connector type.
2. Users create a number of flows utilizing the connectors.
2a. The system creates three groups (gmail, gdrive, gss) and three Cloud Foundry routes.
2b. The system assigns the three routes to the "loopback-connector-provider-google" Cloud Foundry application.
3. The gss connector instances are found to be more resource intensive compared to those of the other two connectors, so need to be isolated to enable more efficient system operation.
4. The system starts a new Cloud Foundry application "loopback-connector-provider-gss", corresponding to Application 2 in the above description, which only runs connectors of type "gss".

4a. The new Cloud Foundry application starts and initializes all the gss connector instances.

4b. The Cloud Foundry route for the gss group is moved, thereby removing it from the first Cloud Foundry application and assigning it to the new Cloud Foundry application 4c. All gss connector instances in the first Cloud Foundry application are now stopped.

4d. The system modifies the first Cloud Foundry application to remove the gss connector from its published capabilities, so all new requests to place a gss resource type are now allocated to the new Cloud Foundry application.

5. The gss connector instances are now only running in the new Cloud Foundry application and the workload associated with the gss connector instances is isolated.

The grouping is thus based on user in Example 1 and connector type in Example 2. The system is not limited to grouping based on user or connector type and the above two examples are given by way of example only. The connectors in Example 2 are specific examples of resource type, so Example 2 can be generalized to any resource type and any number of types. Moreover, any number of possibilities may be employed for the grouping. One further example for grouping is based on historical knowledge of resource requirements for a given resource type (e.g. if the resource has been CPU intensive or memory intensive in the past). Another example for grouping is based on user system usage history (e.g. the user has generated lots of flows, the user has been highly active or less active). Moreover, combinations of factors may be used to make the grouping, e.g. batch jobs of a given user, i.e. a group for a user which contains resources that the user makes use of only periodically, e.g. at the end of each month.

The system may be configured to determine appropriate grouping criteria based on a known property, such as the user id or connector id associated with the resource placement request. Alternatively, the system may automatically determine grouping criteria based on runtime behavior and correlation of common attributes. This may be done statically or dynamically.

Some examples of grouping criteria are now given.

Memory: The system identifies what resources have a memory footprint in a first, second and third range. The system then identifies common properties between said resources, such as connector name or connector type. For example, if there are one third of the total resources in the first memory footprint range, it may be established that a large percentage in this range have a connector name of either 'gmail' or 'gdrive', whereas these connector names are not seen, or seen less commonly, in the second and third memory footprint ranges. The system may then create three groups, one for each memory footprint range, and subsequently use the connector-name that it has determined as an indication of commonality to place gmail and gdrive connectors into the group associated with the first memory footprint range.

Invocations: Similar to the memory example, the system may create and manage groups based on the number of times a particular class of resource is invoked, i.e. used or instantiated. The system will apply analytics to identify commonalities that could be used to help categorize when a request to place a new resource is made.

Time series: Grouping criteria may be defined by time patterns in usage, such as APIs that are invoked at a high rate but all at the end of the day, or at the end of month (such as with batch processing). Commonalities in properties are identified that can be used when a new resource placement request is made in order to decide which group to allocated the new resource to. The analysis of user patterns may be used to identify when to consider scaling out, i.e. when to transfer resources out of an application.

User Tags: In addition to system-defined grouping criteria, users may themselves add tags to resources as part of their placement requests. For example, if the user knows that the resource being placed is a monthly batch job to be carried out shortly after each month end, or an overnight batch job, then it can be tagged accordingly. The system may then be able to use these tags to determine commonalities in resource behavior and thus feed this information into decision making on which group to allocate a resource to. These tags may be persistent, so they can be referred to by the system at any time, or may be temporary and only exist as part of the placement request that is made when the resource is initially placed in the system.

Figure 6:
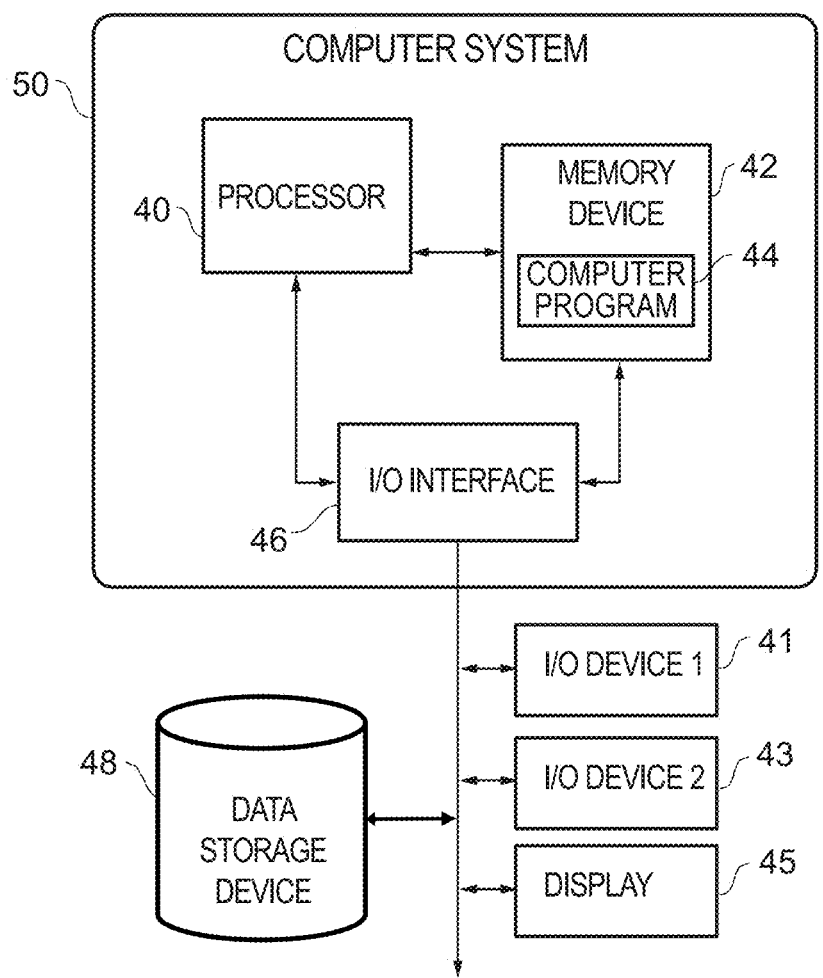
FIG. 6 shows internal structure of a generic computing device which may represent the internal design of computing elements shown in FIG. 1 or FIG. 2.

FIG. 6 shows a generic computing device 50, which may form the above described computer system or part thereof. The computing device 50 comprises a processor 40 to provide a processor resource coupled through an I/O interface 46 to one or more external devices such as I/O devices 41, 43 and a display device 45. The processor 40 may also be connected to one or more memory devices 42. At least one memory device 42 to provide a memory resource contains a stored computer program 44, which is a computer program that comprises computer-executable instructions. The data storage devices 48 may store the computer program 44. The computer program 44 stored in the storage devices 48 is configured to be executed by processor 40 via the memory devices 42. The processor 40 executes the stored computer program 44. The computer device 50 may be configured to run applications that host resources according to embodiments of the disclosure. An input operable to receive a resource placement request to place a resource in an application may be provided by I/O device 41 for example. The processor 40 may be operable to process resource placement requests by assigning a group to the resource being placed, wherein all resources of a given group share a route with a unique endpoint. A further input operable to receive a move request to move a resource out of the application where it is currently placed into another application may be provided by I/O device 43 for example. An application creator operable to create applications may be implemented by computer program 44 stored in memory device 42. A resource mover operable to move a group of resources subject to a move request from one application into another application by moving the group's route to the other application while retaining the group's unique endpoint may also be implemented by the same computer program 44 stored in memory device 42, or a different computer program.

According to the above description, a request for a resource is therefore assigned to a group based on one or more characteristics of the request, resource or user, which may include historical knowledge of prior activity in the host computer system. Whenever the system creates a new group, then a new route and unique endpoint is created for that group, and the route is then assigned to an application that will host the resource initially. Since each group has its own route, the resources belonging to a particular group can be moved as a group, separately from resources that belong to other groups.

The proposed approach has a number of potential advantages. It enables the host system, e.g. an App Connect system, to start small and then scale up efficiently based on usage. This can reduce running costs of the host system by ensuring that the host system does not over allocate capacity, e.g. processing capacity, memory capacity. It enables automatic isolation of workloads without the user needing to be involved in making any changes. It can automatically police service levels, so as to deal with resource bottlenecks, and thereby provide an improved user experience.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of the present disclosure.

What is claimed is:

1. A computer-automated method of managing resources in applications running on a computer system, the resources being managed in groups, each group having a unique group name which is dynamically resolvable to an address specific to a particular application, the method comprising:
   receiving a resource placement request to place a resource in a first application having a first address;
   processing the resource placement request by assigning a group to the resource and a universally unique resource identifier which combines with the group name to form a unique endpoint for the resource, wherein assigning a group to the resource is based on an amount of memory required attribute of the resource;
   receiving a move request to move the resource out of the first application into a second application having a second address; and
   acting on the move request for the resource by moving its group from the first application into the second application by reassigning its group name to the second address, thereby moving all resources in that group to the second application.

2. The method of claim 1, wherein a group is defined by at least one common resource attribute.

3. The method of claim 2, wherein the common resource attribute is at least one of: a user who owns the resource; a type of the resource; a consumption property of the resource; and a tag given to a resource by a user.

4. The method of claim 3, wherein the consumption property of the resource is at least one of: a time pattern of use of the resource; a computing power requirement of the resource; and a memory requirement of the resource.

5. The method of claim 1, wherein the resources are at least one of: application program interfaces; object instances and data sources.

6. The method of claim 1, wherein the move request is triggered by receipt of a user request.

7. The method of claim 1, wherein the move request is triggered by a determination made by the system derived from monitoring activity in the application.

8. The method of claim 7, wherein the activity is monitored on a per group basis.

9. The method of claim 1, wherein the first and second applications are platform-as-a-service, PaaS, applications.

10. The method of claim 1, further comprising creating the second application as a new application responsive to the move request.

11. The method of claim 1, wherein the addresses are IP addresses.

12. The method of claim 1, wherein the second application is managed in the same way as the first application.

13. A computer program product for managing resources in applications running on a computer system, the resources being managed in groups, each group having a unique group name which is dynamically resolvable to an address specific to a particular application, the computer program product comprising a computer-readable storage medium having programming instructions embodied therewith, the program instructions being executable by a processor of a computer to perform a method, the program instructions comprising instructions for:
   receiving, by the processor, a resource placement request to place a resource in a first application having a first address;
   processing, by the processor, the resource placement request by assigning a group to the resource and a universally unique resource identifier which combines with the group name to form a unique endpoint for the resource, wherein assigning a group to the resource is based on an amount of memory required attribute of the resource;
   receiving, by the processor, a move request to move the resource out of the first application into a second application having a second address; and
   acting, by the processor, on the move request for the resource by moving its group from the first application into the second application by reassigning its group name to the second address, thereby moving all resources in that group to the second application.

14. The computer program product of claim 13, wherein a group is defined by at least one common resource attribute.

15. The computer program product of claim 14, wherein the common resource attribute is at least one of: a user who owns the resource; a type of the resource; a consumption property of the resource; and a tag given to a resource by a user.

16. The computer program product of claim 15, wherein the consumption property of the resource is at least one of: a time pattern of use of the resource; a computing power requirement of the resource; and a memory requirement of the resource.

17. A computer system for running applications that host resources and for managing resources within their applications, the resources being managed in groups, each group having a unique group name which is dynamically resolvable to an address specific to a particular application, the system comprising:
   a computer having a processor and a computer-readable storage device;
   a program having programming instructions embodied on the storage device for execution by the processor, the programming instructions comprising instructions to:
   receive a resource placement request to place a resource in a first application having a first address;
   process the resource placement request by assigning a group to the resource and a universally unique resource identifier which combines with the group name to form a unique endpoint for the resource, wherein assigning a group to the resource is based on an amount of memory required attribute of the resource;
   receive a move request to move the resource out of the first application into a second application having a second address;
   create applications; and
   act on a move request for a resource by moving that resource's group from the first application into the second application by reassigning its group name to the second address, thereby moving all resources in that group to the second application.

18. The computer system of claim 17, wherein a group is defined by at least one common resource attribute.

19. The computer system of claim 18, wherein the common resource attribute is at least one of: a user who owns the resource; a type of the resource; a consumption property of the resource; and a tag given to a resource by a user.

20. The computer system of claim 19, wherein the consumption property of the resource is at least one of: a time pattern of use of the resource; a computing power requirement of the resource; and a memory requirement of the resource.

* * * * *